3,148,970
GELLED AMMONIA SOLUTION AND METHOD
FOR PRODUCING SAME
Homer A. Smith, Berkeley Heights, and Edgar W. Sawyer,
Jr., Metuchen, N.J., assignors to Minerals & Chemicals
Philipp Corporation, Menlo Park, N.J., a corporation
of Maryland
No Drawing. Filed Mar. 28, 1961, Ser. No. 98,746
11 Claims. (Cl. 71—54)

The subject invention relates to the gelation of aqueous solutions of ammonia, and is a continuation-in-part of our copending application, Serial No. 668,883, filed July 1, 1957, now abandoned.

It has been suggested to gel an ammonia solution with clay to provide a base material capable of suspending finely divided, insoluble particles, such as, for example, particles of plant food material. It has been found, however, that large quantities of colloidal clay are required to obtain a stable, gelled concentrated aqueous ammonia solution. Apparently, the presence of substantial ammonia in the water in which the clay is colloidally dispersed impairs the normal ability of the clay to thicken the water when colloidally dispersed therein. For example, it is known that water, and various aqueous vehicles, can be thickened to a stable gelled structure by dispersing therein colloidal attapulgite clay or Wyoming bentonite in amount of only about 5% of the weight of the aqueous system. To thicken concentrated ammonia water into a stable gel system, about four times as much clay must be used as is required to thicken water to about the same consistency. While the presence of large quantities of clay with the ammonia is not objectionable in many instances, the use of large quantities of clay adds to the cost of the formulation. Further, many clay-gelled ammonia water systems tend to bleed excessively although considerable clay is present in the system, e.g., in amount of the order of about 15–20% by weight of the composition.

Accordingly, an object of this invention is to provide stable gelled or thickened aqueous solutions of ammonia.

A further object of this invention is the provision of methods for gelling concentrated ammonia solutions to a desired consistency with small quantities of colloidal clay.

Stated briefly, in accordance with the present invention, aqueous solutions of ammonia are gelled by initially forming an ammoniated dispersion of colloidal clay and incorporating into the dispersion an extremely small quantity, sufficient to thicken the dispersion, of a soluble source of at least one ion selected from the group consisting of $Mg^{++}$, $Ca^{++}$, $Ba^{++}$ and $Al^{+++}$.

The gelled ammonia concentrates obtained in this manner are useful per se, as a substitute for ammonia water in those applications where a bodied composition is preferred to a thin fluid. Thus, for example, the gelled ammonia water may be used as a window or glass cleaner which will be less liable to drip after application to a vertical surface than a simple aqueous solution of ammonia.

An important use of the gelled ammonia concentrates is as a base for stably suspending finely divided plant food material such as, for example, ammonium phosphate. A liquid fertilizer composition formulated in this manner has several advantages over a liquid fertilizer composition obtained by simple solution of ingredients. The former can be materially richer in plant food material than the latter and, therefore, broader ranges of formulations may be obtained with the gelled ammonia. As an example, ammonium phosphate is poorly soluble in ammonia water. Therefore, high nitrogen, high phosphorus liquid formulations normally cannot be produced by dissolving ammonium phosphate in ammonia water. By using ammonia water in gelled form, relatively large quantities of ammonium phosphate can be homogeneously suspended in the gelled base.

Yet another use of the aqueous ammonia gel of this invention is as a base in the formulation of mildly abrasive cleaning formulations. In producing such a formulation, a mild abrasive such as diatomaceous earth is suspended in the thickened ammonia water and, preferably, a surface active agent, especially an anionic or nonionic surface active agent, is dissolved in the composition.

More specifically, the clay we preferably use in carrying out our invention is a colloidal grade of clay containing a predominant amount of the clay mineral, attapulgite, a unique magnesium aluminosilicate. By "colloidal" clay, we refer to a clay which is capable of being dispersed in water into its ultimate colloidally dimensioned particles. This property is possessed by raw attapulgite clay, as mined, which has a volatile matter content (V.M.) of about 48%. The colloidal properties are substantially maintained until the clay is dried to a V.M. of about 10%, although optimum colloidal properties are possessed by attapulgite clay which has never been dried to a V.M. below about 18%. Thus, we prefer to employ attapulgite clay which has never been dried to a V.M. below about 18%. Raw clay may be used, although clay which has been refined to eliminate grit and coarse agglomerates may be preferred. The term "volatile matter" as used herein refers to the weight percent of a material lost when it is heated to constant weight at 1800° F. The volatile matter of attapulgite clay is predominantly water.

Unlike most clays, such as bentonite clay and kaolin clay which are composed of layered minerals, attapulgite clay is composed of ultimate colloidally dimensioned needlelike particles. Colloidal grades of attapulgite clay gel or thicken aqueous systems when dispersed therein because of the unique orientation of the colloidal attapugite needles in the vehicle. In contrast, bentonite clays thicken water by a distinct hydration which in effect pries apart the layers of the clay mineral, causing the mineral to swell. Swelling bentonite clays, such as hectorite and Wyoming bentonite, may be used in carrying out our invention. Sepiolite clay, especially alpha sepiolite clay, which is generally similar to attapulgite clay, should be as satisfactory as attapulgite clay when it is available. Kaolin clay, which is not a colloidal clay (as such clay is defined above) is not suitable in the practice of this invention.

The quantity of colloidal clay we employ in producing gelled concentrated ammonia solutions is from about 1% to about 20%, based on the weight of the gel composition. Compositions containing clay in excess of about 10% by weight are apt to be too thick and pastelike for many applications although such a consistency may be desirable in other applications. Use of colloidal clay in amount less than about 1% by weight of the composition may not suffice to provide systems having sufficient consistency to suspend finely divided solids. Generally speaking, a preferred range of clay content is from about 2% to about 7% by weight of the gelled composition.

As a general rule, the quantity of clay required to provide a system of given viscosity will vary directly with the ammonia content of the ammonia water to be thickened and will vary inversely with the quantity of solid material suspended in the system and the quantity of divalent or trivalent metal ions introduced into the system. Highly refined clays can be used in smaller quantities than less pure clays.

In all cases, however, the minimum quantity of clay which must be used to thicken these systems to any extent and maintain a uniform gel throughout must be an amount whose gel volume is not less than the liquid volume of the system in which it is dispersed. This will be a function of the clay used, soluble components in the system and and the method of dispersion used. If any of these variables is such that the gel volume is less than the system volume, the dispersed clay will shrink to its gel volume and a portion of the liquid will not be thickened. Naturally, the unthickened portion will no longer be able to suspend solids.

As soluble sources of polyvalent metallic ions thickening agent may be mentioned lime, hydrated lime, MgO, hydratable MgO, portland cement, $Ba(OH)_2$, alum, alkaline earth salts of acids such as formic, acetic, carbonic, sulfuric, hydrochloric.

The source of polyvalent metallic ion is used in amount within the range of about 0.5% to 10% of the weight of the clay, preferably in amount of 0.5% to 5.0% by weight of the clay. It will be readily apparent that the source of the polyvalent metallic ion thickener is used in an extremely small quantity relative to the total weight of gelled ammonia water. For example, in gelling ammonia water with 3% clay and lime in amount of 2% of the clay weight, the lime content of the gelled ammonia water composition will be of the order of only 0.0006% of the total composition weight. At a given clay concentration gel systems of increasing consistency are obtained by increasing the content of polyvalent metal ion with additional effects tending to minimize at about 5% polyvalent ion, based on the weight of the clay.

This invention is applicable to the production of aqueous gels of ammonia analyzing about 5% to about 30% by weight of $NH_3$, especially gels containing 10% to 25% $NH_3$, based on the weight of the total gel composition. Generally speaking, the vapor pressure of ammonia gels analyzing in excess of about 25% is too high for practical usage. On the other hand, dilute ammonia solutions, such as those containing less than about 5% ammonia, do not present the difficulties experienced in gelling solutions having a higher $NH_3$ content. Thus, very dilute ammonia solutions may be thickened directly with clay and do not differ appreciably from water in their ability to be thickened directly by dispersion of clay therein.

In putting this invention into practice, clay may be colloidally dispersed in previously prepared concentrated ammonia water and the source of divalent or trivalent ions incorporated therein to effect the desired gelation. Alternatively, the clay may be pregelled in water and ammonia, liquid or gas, added and mixed into the clay pregel, preferably with cooling of the clay gel during introduction of ammonia. The consistency of the clay dispersion will vary with the strength of the ammonia and with the clay content. When clay is present in amount within the preferred range of about 2% to about 7% by weight, the dispersions are usually distinctly fluid. Upon addition of small quantities of lime or the like, the clay dispersion gels. Gelation takes place substantially instantaneously upon introduction of suitable polyvalent ions, provided the mixing is adequate. Where mixing is inadequate, gelation will progress more slowly and may require several hours or more.

A small amount of a deflocculating agent is preferably used to facilitate the initial dispersion of attapulgite clay in water or ammonia water. Recommended deflocculating agents for this clay are alkali metal salts of molecularly dehydrated phosphates, e.g., tetrasodium pyrophosphate. Suitable quantities of dispersant are generally within the range of 0.25% to 2.0% of the clay weight. As is known in the art, attapulgite clay and sepiolite clay are colloidally dispersed in aqueous systems by applying shear to the system (as contrasted with bentonite which hydrates and swells merely upon contact with water with mild mixing). Various high shear agitating equipment, such as a ball mill, colloid mill, gear pump, etc., may be used to effect colloidal dispersion of attapulgite clay.

The invention will be more fully understood by the following illustrative embodiments thereof. In the examples, all parts represent parts by weight and, unless otherwise indicated, the parts of clay represent the weight of clay on an "as is" clay basis, i.e., inclusive of free moisture and combined water associated with the clay.

EXAMPLE I

This example illustrates the production of stable gelled ammonia water concentrates in acocrdance with this invention. Also illustrated is the necessity for incorporating trace quantities of divalent metal ion when thickening concentrated aqueous ammonia solutions with moderate quantities of clay.

In attempting to produce thickened ammonia water, the following procedure was used. Initially, the colloidal clay was dispersed in water having tetrasodium pyrophosphate (TSPP) disolved therein. Dispersion was accomplished by mixing the clay in a dilute tetrasodium pyrophosphate solution at low speed in a Waring Blendor for 20 minutes. Dispersion was carried out at room temperature. The clay dispersion was then cooled to about 40° F. and anhydrous ammonia gas was bubbled into the cooled gel to an ammonia content of about 15% of the composition weight. When used to flocculate the ammoniated clay dispersion, lime (as CaO) was mixed into the ammoniated gel at room temperature. Compositions produced using a refined colloidal grade of attapulgite clay and their properties are described in Table I.

*Table I*

THICKENING OF AMMONIA WATER WITH COLLOIDAL ATTAPULGITE CLAY [1]

| Composition | | | | |
|---|---|---|---|---|
| Percent Clay, Based on Weight of Water | Percent Lime, Based on Weight of Clay | Percent TSPP, Based on Weight of Clay | Results (after Standing 24 hours) | Sample No. |
| 10 | 0 | 0.25 | Soft, fluid gel, stable | 1 |
| 10 | 2 | 0.25 | Light gel, thicker than No. 1 Sample. | 2 |
| 10 | 5 | 0.25 | Heavy gel, stable | 3 |
| 5 | 0 | 0.25 | Gel broke, clay settled | 4 |
| 5 | 1 | 0.25 | Light gel, stable | 5 |
| 5 | 2 | 0.25 | Medium gel, stable | 6 |
| 5 | 5 | 0.25 | Thixotropic gel, stable | 7 |
| 5 | 10 | 0.25 | Pastlike gel, stable | 8 |
| 3 | 0 | 0.25 | Light unstable gel | 9 |
| 3 | 2 | 0.25 | Light gel, stable | 10 |
| 3 | 5 | 0.25 | Medium gel, stable | 11 |
| 2 | 0 | 0.25 | Liquid, clay settled | 12 |
| 2 | 2 | 0.25 | Light gel, stable, very fluid. | 13 |
| 2 | 5 | 0.25 | _____do_____ | 14 |

[1] V.M. as produced—25%.

The data show that lime was required to obtain stable ammonia water gels with only 2%–5% colloidal attapulgite clay. Thus, samples 4 and 9, containing 3% and 5% attapulgite clay, respectively, and no lime, were light gels which broke down into separate solid and liquid phases after standing for one day. By incorporating from 1% to 5% lime (based on the clay weight) into systems such as samples 9 and 4 containing 3% to 5% clay, stable gels were produced (samples 5 through 8 and 10 through 11).

The data also show that the consistency of gels obtained by incorporating lime into dispersions of attapulgite clay in amomnia water increased with increments in quantity of lime used. By varying the lime content from 1% to 10% of the clay weight (samples 5 through 8), stable thickened systems ranging in consistency from light stable gels through pastelike gels were obtained.

The data show further that no thickening was obtained by the dispersion of 2% of attapulgite clay in ammonia water (sample 12). However, addition of small amounts of lime to such dispersion (samples 13 and 14) resulted in the production of stable, light fluid gels.

The data also show that through the use of lime stable thickened ammonia water systems of a given consistency could be obtained using only a fraction of the amount of clay in the absence of lime. Sample 13, for example, containing only 2% lime (based on the weight of the clay) had approximately the same consistency as sample 1 containing 5 times as much clay. Similarly, sample 10 containing 5% attapulgite clay and 2% lime (based on the clay) had a heavier consistency than sample 1 containing 3⅓ times the amount of clay.

EXAMPLE II

This example illustrates the production of gelled ammonia water, also in accordance with this invention, by dispersing colloidal clay directly into a concentrated aqueous solution of 58% ammonium hydroxide (about 18% $NH_3$) and then incorporating lime.

3% Wyoming bentonite was dispersed in the ammonium hydroxide solution at room temperature by mixing the ingredients in a Waring Blendor at low speed with the jar sealed.

1% lime (based on the clay weight) was added to the fluid clay dispersion and was uniformly mixed therein, thus forming a thin, stable fluid gel.

It will be distinctly understood that the examples given above are illustrative only and that variations from the reported consistencies of the ammonia water gels should be expected with clays of different origin as well as with clays which have undergone different preliminary refinement.

We claim:

1. A gelled ammonia concentrate comprising a 5% to 30% solution of ammonia in water having dispersed therein from about 1% to about 20% by weight of colloidal clay and having dissolved therein, in amount sufficient to produce a stable gelled system, a soluble source of at least one material selected from the group consisting of $Ca^{++}$, $Mg^{++}$, $Ba^{++}$ and $Al^{+++}$.

2. The composition of claim 1 in which said source of metallic ions is lime.

3. The composition of claim 1 in which said clay is attapulgite.

4. The composition of claim 1 in which said clay is bentonite.

5. The composition of claim 1 in which said source of metallic ions is present in amount within the range of about 0.5% to about 10%, based on the weight of said clay.

6. The composition of claim 1 in which said colloidal clay is present in amount within the range of about 2% to about 7% by weight and said source of ions is present in amount within the range of 0.5% to 10%, based on the weight of said clay.

7. A gelled ammonia concentrate suitable as a base for suspending finely divided solids and consisting essentially of a 5% to 30% solution of ammonia in water having dispersed therein from about 1% to about 20% by weight of colloidal clay and containing from about 0.5% to about 10%, based on the weight of said clay, of a soluble source of at least one material selected from the group consisting of $Ca^{++}$, $Mg^{++}$, $Ba^{++}$ and $Al^{+++}$.

8. The gelled concentrate of claim 7 having finely divided particles of plant food material suspended therein.

9. A gelled ammonia concentrate suitable as a base for suspending finely divided solids and consisting essentially of a 5% to 30% solution of ammonia in water, colloidal attapulgite clay dispersed in said solution in amount of about 2% to about 7% by weight and lime in amount of about 0.5% to about 10% based on the weight of said clay.

10. A gelled ammonia concentrate suitable as a base for suspending finely divided solids and consisting essentially of a 5% to 30% solution of ammonia in water, Wyoming bentonite dispersed in said solution in amount of about 2% to about 7% by weight and lime in amount of about 0.5% to about 10% based on the weight of said clay.

11. A method for producing a gelled concentrated aqueous solution of ammonia which comprises forming a dispersion of colloidal clay in a 5% to 30% solution of ammonia in water and dissolving therein a soluble source of at least one material selected from the group consisting of $Ca^{++}$, $Mg^{++}$, $Ba^{++}$ and $Al^{+++}$ in amount sufficient to thicken said dispersion of colloidal clay in the solution of ammonia.

References Cited in the file of this patent

UNITED STATES PATENTS

| | | |
|---|---|---|
| 2,672,442 | Clem | Mar. 16, 1954 |
| 2,742,345 | Kloepfer et al. | Apr. 17, 1956 |
| 2,971,292 | Malecki | Feb. 14, 1961 |
| 2,991,170 | Szepesie et al. | July 9, 1961 |